US011356471B2

(12) United States Patent
Stanley et al.

(10) Patent No.: US 11,356,471 B2
(45) Date of Patent: Jun. 7, 2022

(54) SYSTEM AND METHOD FOR DEFENDING A NETWORK AGAINST CYBER-THREATS

(71) Applicant: Booz Allen Hamilton Inc., McLean, VA (US)

(72) Inventors: Sean Stanley, Thurmont, MD (US); James Petersen, Alexandria, VA (US); Christopher Forant, Mount Airy, MD (US); Matthew Rausch, Sykesville, MD (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 208 days.

(21) Appl. No.: 16/537,013

(22) Filed: Aug. 9, 2019

(65) Prior Publication Data
US 2021/0044599 A1 Feb. 11, 2021

(51) Int. Cl.
*H04L 9/40* (2022.01)

(52) U.S. Cl.
CPC ........ *H04L 63/145* (2013.01); *H04L 63/0227* (2013.01); *H04L 63/1416* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 7,665,135 B1 | 2/2010 | Mohiuddin et al. | |
| 8,874,926 B1* | 10/2014 | Edwards | G06F 21/556 713/180 |
| 2001/0039579 A1* | 11/2001 | Trcka | H04L 63/1425 709/224 |
| 2003/0217292 A1* | 11/2003 | Steiger | H04L 63/20 713/168 |
| 2004/0190547 A1* | 9/2004 | Gordy | H04L 63/1408 370/463 |
| 2004/0250124 A1* | 12/2004 | Chesla | G06F 21/552 709/224 |
| 2005/0018618 A1 | 1/2005 | Mualem et al. | |
| 2006/0137009 A1* | 6/2006 | Chesla | H04L 63/1408 726/22 |

(Continued)

OTHER PUBLICATIONS

International Search Report and Written Opinion of the International Searching Authority (Forms PCT/ISA/220, PCT/ISA/210 and PCT/ISA/237) dated Oct. 26, 2020, by the International Bureau of the U.S. Patent and Trademark Office in corresponding International Application No. PCT/US2020/044810. (21 pages).

*Primary Examiner* — Yogesh Paliwal
*Assistant Examiner* — Hassan Saadoun
(74) *Attorney, Agent, or Firm* — Buchanan Ingersoll & Rooney PC

(57) ABSTRACT

A system for defending a network against one or more cyber-threats. The system can include a network bus that includes a first node and a second node, such that network traffic flows from the first node to the second node. The system can include an intrusion defense unit connected to the network bus, such that network traffic between the first node and the second node passes through the intrusion defense unit, wherein when a potential cyber-threat is detected in the network traffic, the intrusion defense unit is configured to engage an associated switch to filter the network traffic until the cyber-threat is neutralized.

14 Claims, 4 Drawing Sheets

(56) References Cited

U.S. PATENT DOCUMENTS

| | | | |
|---|---|---|---|
| 2016/0164890 A1* | 6/2016 | Haugsnes | G06F 16/24575 726/23 |
| 2019/0230116 A1 | 7/2019 | Compton | |
| 2020/0014707 A1* | 1/2020 | Xie | H04L 43/10 |

* cited by examiner

SYSTEM AND METHOD FOR DEFENDING A NETWORK AGAINST CYBER-THREATS

FIELD

Aspects of the present disclosure provide systems and methods for defending a network against cyber-threats.

BACKGROUND INFORMATION

Cyber-threats have successfully evolved from operating on traditional TCP/IP-based enterprise networks into threats that can manifest themselves into cyber-physical system environments ranging from small embedded control systems to vehicles and their current/future autonomy. Today, success in defending the critical architectures of these environments is based on protecting the hardware, operating systems, software applications, and networks comprising these environments.

In many scenarios, detection alone is not sufficient. These environments require a more active type of defense, one that allows not only for the detection and reporting of an anomaly, but also provides active defense operations against associated cyber-threats. The present disclosure provides exemplary embodiments of systems and methods for such active defenses against cyber-threats.

SUMMARY

A system for defending a network against one or more cyber-threats is disclosed. The system can include a network bus that includes a first node and a second node, such that network traffic flows from the first node to the second node; an intrusion defense unit connected to the network bus, such that network traffic between the first node and the second node passes through the intrusion defense unit, wherein when a potential cyber-threat is detected in the network traffic, the intrusion defense unit is configured to engage an associated switch to filter the network traffic until the cyber-threat is neutralized.

A method for defending a network against one or more cyber-threats is disclosed. The method can include detecting a potential cyber-threat in network traffic flowing from a first node to a second node within a network bus, wherein the network traffic between the first node and second node passes through an intrusion defense unit; and filtering network traffic via the intrusion defense unit and an associated switch connected to the network bus, when the potential cyber-threat is detected, wherein the filtering is performed until the cyber-threat is neutralized.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Figure 1:
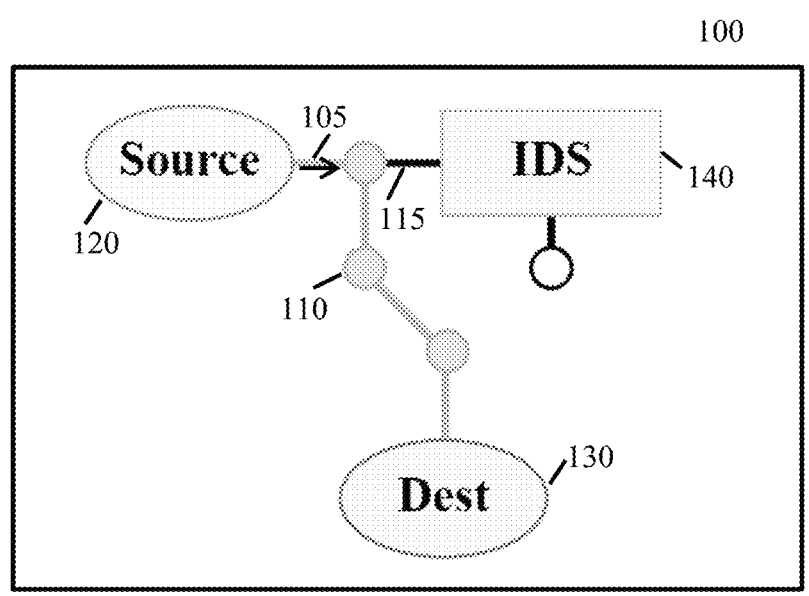
FIG. 1 illustrates an exemplary system for defending a network against cyber-threats.

FIG. 1 shows an exemplary system 100 for defending a network against one or more cyber-threats. The system 100 can use cyber analytics platforms and protocols to guide advanced cyber-threat defense capabilities, as described in detail herein. The cyber-threat defense capabilities can be configured to deliver near real-time cyber-threat detection, correlation, and defense of networks from sophisticated attacks.

A network, as used herein, can be a computer network, a data network, or a digital telecommunications network. The network can allow nodes operating in the network to share resources with each other using connections (data links) between nodes. The network can be a public network, which is publicly accessible, or a private network such as within a company.

Defending a network, as described herein, can relate to the policies and practices adopted to prevent and monitor unauthorized access, misuse, modification, or denial-of-service attacks of a network and network-accessible resources. For example, defending information bus networks for vehicles and their integrity by investigating vehicle hacking. Such investigations can involve onsite inspections of affected vehicles to collect traffic from on-vehicle buses and the various vehicle wireless interfaces. The collected traffic can be used to identify patterns of potential malicious behavior that could provide evidence of vehicle tampering and potentially compromised Electronic Control Units (ECU).

Cyber-threats, as used herein, can include software, data, or a sequence of commands that takes advantage of a bug or vulnerability to cause anomalous to occur on computer software, hardware, or a network. Such behavior can include gaining control of a computer system, allowing privilege escalation, or a denial-of-service (DoS or related DDoS) attack. A DDoS attack may yield positive and negative transmission frequency fluctuation, which can be used to recognize an abnormal change of data transmission rate. A DoS attack on a network can span a wide range of cycled message IDs for a network bus, yielding an increase of network traffic as well as the potential to attempt a shutdown of the network via overload and/or service request message IDs or frame data formats.

The anomalous behavior caused by a cyber-threat can be identified by establishing a baseline of normal network behavior and then continuously monitoring the network for unusual data, events, or trends, for example, bandwidth anomaly, payload anomaly for MAC Spoofing, Duplicate MAC, Arbitration ID Spoofing, Privilege Escalation, and DTC (Diagnostic Trouble Code), and/or Controller Area Network (CAN) Bus Message Insertion.

Cyber-threats can include malicious entry-point tampering of accessible entry-point modules on the network bus and unexpected/unallowable formats or message IDs. Cyber-threats can also include causing malfunction of a network control unit that results in corruption of data.

Cyber-threats can use prior knowledge/deductive reasoning, where the attacker has either prior knowledge of the defined bus protocol methods or has been able to deduce them by some means. In this situation the attacker may be able to inject malicious data formats or infrequent priority message IDs to request information or send a command.

Cyber-threats can originate remotely and exploit security vulnerabilities. Cyber-threats can use information obtained from prior access to a vulnerable system and provide privileges not granted by the system administrator or increase privileges of the person running the exploit above those granted by the system administrator. For example, cyber-attacks can be used to first gain low-level access, then to escalate privileges repeatedly until it reaches the highest administrative level. It can also include exploits against a client application, consisting of modifying servers to launch an exploit if accessed by the client application.

Cyber-threats can originate from sources within and/or outside a network. They can be passive, where they intercept data traveling through the network, or active where they initiate commands to disrupt the network's normal operation or to conduct network reconnaissance and lateral movement to find and gain access to assets accessible via the network. Network reconnaissance can include understanding the environment of a network, gathering information about the network for planning an attack approach, and/or fingerprinting the environment using corresponding techniques for the subsequent attack phases.

Cyber-threats can be used in computer and network surveillance, wiretapping, fiber tapping, port scanning, idle scanning, keystroke logging, screen scraping, backdoor entry, denial-of-service attacks, spoofing, man-in-the-middle attacks, man-in-the-browser attacks, ARP poisoning, ping flooding, pinging of death, Smurf attacks, buffer overflows, heap overflows, stack overflows, or format string attacks.

Cyber-threats can be any type of offensive maneuver that targets computer information systems, infrastructures, computer networks, devices with computer processors, or personal computer devices. They can steal, alter, or destroy a specified target by hacking into a susceptible system or installing spyware. Other examples of cyber-threats can include, but are not limited to, any mechanism to expose, alter, disable, destroy, steal or gain unauthorized access to or make unauthorized use or corruption of any data, device, or other component of the environment or network that supports information-related activities.

In an exemplary embodiment, the system 100 can include a network bus 110 that includes a first node 120 and a second node 130, such that network traffic 105 flows from the first node 120 to the second node 130. Between the first node 120 and the second node 130 there can be one or more nodes through which the network traffic 105 flows.

A network bus (e.g. 110), as used herein, can be a communication system that transfers data among components inside a computer (e.g., a node), or among computers. It includes related hardware components (e.g., wire, optical fiber, etc.) and software, including communication protocols.

The network bus 110 can use both parallel and serial ports, and can be wired in a multidrop (e.g., electrical parallel) or daisy chain topology, or connected by switched hubs, as in the case of USB. The parallel and serial ports on the network bus 110 can operate concurrently, with a certain section of the network bus 110 (e.g. between 120 and 130) operating serially, and other sections operating in parallel. The serial flow of network traffic 105 can include sending data one bit at a time, sequentially, over the network bus 110. In contrast, parallel flow can include conveying multiple binary digits (bits) simultaneously.

In an exemplary embodiment, the network bus 110 can be a controller area network (CAN bus), which is a robust vehicle bus standard designed to allow microcontrollers and devices to communicate with each other in applications without a host computer. It is a message-based protocol that can be used for multiplex electrical wiring within automobiles. Of course, it can also be used in many other contexts. Other non-limiting examples of network bus protocols 110 include SAE J1708, MIL-STD 1553, RS232, RS422, RS485, SAE J1939, SAE J1587.

In an exemplary embodiment, the network bus can be an internal bus, which can connect all the internal components of a computer, such as CPU and memory, to the motherboard. The network bus can be an external bus made up of electronic pathways that connect various external devices, such as printers, etc., to the computer (in this example, the first node/second node).

A node (e.g., first node 120/second node 130), as used herein, can be any physical device within a network of other devices that is able to send, receive, and/or forward information. Examples include computers, modems, switches, hubs, bridges, servers, and printers. Nodes can have some form of identification, like an IP or MAC address, for it to be recognized by other network devices.

Network traffic, as used herein, is the amount of data moving across a network at a given point of time. Network traffic can be encapsulated in network packets that provide the load on the network. Network traffic can be measured via various techniques (e.g., sniffing, or measuring bandwidth use) as described in detail below. Network traffic can include network messages or recognition that actions or behaviors by devices on the network are anomalous in the context of the then current network activity or protocols.

The system 100 can include an intrusion defense unit 140 connected to the network bus 110, such that network traffic 105 between the first node 120 and the second node 130 passes through the intrusion defense unit 140. The intrusion defense unit 140 is capable of detecting, logging, reporting, mitigating, and defending against a variety of cyber threats to support the security, integrity, and availability of the network.

The intrusion defense unit 140 can be implemented on various kinds of computers/processors. For example, GPU-enabled devices (e.g., NVIDIA Jetson platform) for computing with heavy workload demands can be used. Such devices can deliver the performance of a GPU workstation in an embedded module, designed for robots, drones and other autonomous machines that require high levels of computing power in a stand-alone operating environment to run artificial intelligence (AI) based workloads.

By utilizing the GPU processing power, the intrusion defense unit 140 can allow for a network bus filtering design that can significantly reduce the concern of performance degradation of the bus in a defense scenario. Of course, the intrusion defense unit 140 can be implemented on other computer processors.

The physical design of the intrusion defense unit 140 can include physical components that are ruggedized against temperature, shock, vibration, salt fog, and immersion. Such ruggedized components can allow integration of the intrusion defense unit 140 into military platforms.

In an exemplary embodiment, the intrusion defense unit 140 can intercept network traffic 105 in the network bus 110. This interception 115 can then be logged and cascaded to a series of processes to convert that raw data to searchable and usable data. Once the data is converted to this form within the software flow, the intrusion defense unit 140 can rapidly perform statistical analysis on transmission frequency and content as well as signature validation of uniquely defined bus identifiers and frame data formats.

In an exemplary embodiment, the signature validation can operate on both primary aspects of the bus data format; unique message identifiers (message ID) and transmitted uniquely targeted data (frame data). Through an understanding of the target protocol and frame format, these two primary sources of information can then be reviewed for verification of their specific deployment activity. The identifiers can be verified for architected presence on the bus. For example, target protocols SAE J1939 and MIL-STD 1553 can have predefined identifiers that are the subject of the protocol definition itself. Additionally, each protocol can also provide support for uniquely defined deployment identifiers for their target vehicle's network modules as well, which may be defined on a case-by-case basis. The network traffic 105 can be reviewed using valid identifiers to validate current identifiers.

In an exemplary embodiment, the intrusion defense unit 140 can log raw data generated from the first node 120 to an input log file. Before any data is converted to a format, it can be timestamped and written out to a log file that can be configured for an appropriate protocol logging format. The intrusion defense unit 140 can then log reported statistics, attacks, or errors, which can be provided to a user per request.

Thereafter the intrusion defense unit 140 can log group statistical analysis reports of the network traffic 105 on the network bus 110. These groups can be uniquely defined per use-case by either time or frame count and can also be used for operator notification. Examples of the groups include most frequent arbitration ID, least frequent arbitration ID, percentage of most frequent ID, time period, total frame count, standard deviation of unique ID count, lowest unique ID count, highest unique ID count, average unique ID count.

FIG. 1 illustrates that the intrusion defense unit 140 passively monitoring the network traffic 105. Such a mode of the intrusion defense unit 140 is called a monitoring mode. In this mode, the intrusion defense unit 140 can monitor the network traffic 105 between the first node 120 and the second node 130 without interfering with the performance of the network bus 110.

The intrusion defense unit 140 can be inserted into a network at any location and attached to the network bus 110 in a manner that will allow it to listen passively to the network traffic 105. This passive listening ensures that its highest priority functions of being able to detect, log, and report a cyber-threat are able to operate at their fullest extent while still preventing any impact to the regular performance of the bus.

In an exemplary embodiment, the intrusion defense unit 140 can function in a multi-modal configuration using a series of Metal-Oxide Semiconductor Field-Effect Transistors (MOSFET) as a digitally controlled switches within the network bus 110. The monitoring mode can be the default operating mode of the intrusion defense unit 140 under circumstances where a cyber-threat to the network has not been identified, or after the cyber-threat has been neutralized.

In the monitoring mode, it is not physically possible for the intrusion defense unit 140 to interfere with the performance of the network as it is not a required pass-through for the network flow. For this reason, in the event of an intrusion defense unit 140 failure, the monitoring mode may be the default state.

The ability to record all network data is also an important design consideration of the intrusion defense unit 140 deployment in the network bus 110. It allows for the future refinement and/or expansion of the intrusion defense unit 140 deployment. As such, a local storage, such as an SD card, can be used to log data. Of course, an external storage, or a combination of local and external storage can also be used.

In an exemplary embodiment, multiple entry points on the network bus 110 can be monitored by attaching multiple intrusion defense units (e.g. 140) to the network bus 110 based on the configuration needed. These inline devices can be placed on the network at the outermost modules that have a potential attack surface area. This can allow the intrusion defense unit 140 to protect the entire network and prevent a scenario where only a partial protection solution is provided.

In the event a cyber-threat is detected, the intrusion defense unit 140 can switch to a mitigation and defense mode by sending a digital signal to the MOSFET and breaking the direct connection between the first node 120 and the second node 130 so that the intrusion defense unit 140 is placed in line with that connection to filter the content over the network bus 110, thus isolating the cyber-threat to its first node 120.

Figure 2:
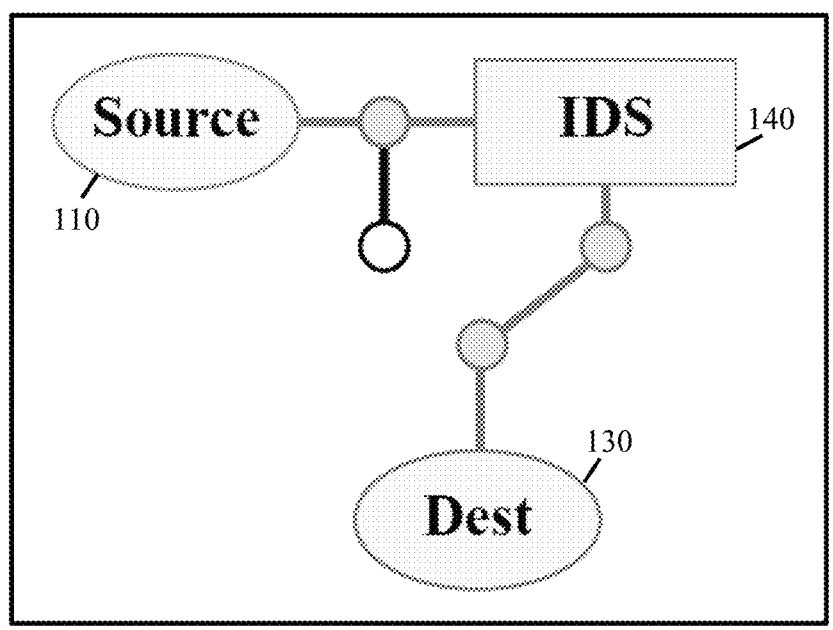
FIG. 2 illustrates an exemplary system for defending a network against cyber-threats.

FIG. 2 shows the system 100 in a mitigation and defense mode for mitigation and defense of cyber-threats within the network in parallel with the detection, reporting, and logging of these same threats. In a case where the monitoring mode and the mitigation and defense mode conflict, priority can be assigned to the monitoring mode.

The mitigation and defense mode can be triggered by the detection of a cyber-threat on the network bus 110 prompting the intrusion defense unit 140 to switch from passive listening mode (i.e., monitoring mode) to active filtering mode (i.e., mitigation and defense mode). As soon as this threat is detected, the network traffic will be redirected through the intrusion defense unit 140 for filtering and verification.

The intrusion defense unit 140 will continue to operate in this mitigation and defense mode until a fully customizable period of only appropriate, untampered, and non-anomalous frames have been present on the bus. At the end of such period, the intrusion defense unit 140 will default back to its state of being parallel to the network bus (i.e., monitoring mode).

Figure 3:
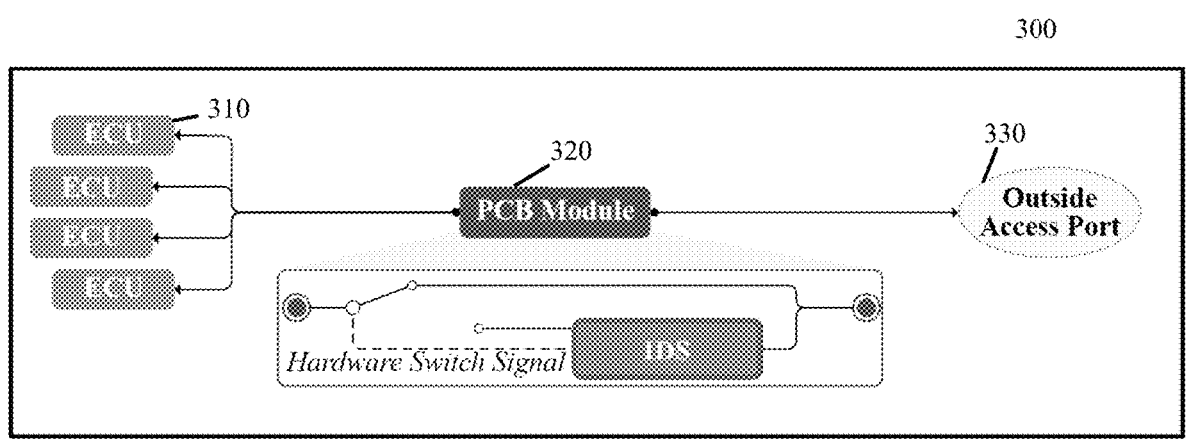
FIG. 3 shows an exemplary physical integration diagram according to an exemplary embodiment of the present disclosure.

FIG. 3 shows an exemplary physical integration of an intrusion defense unit (e.g., 140) in a vehicle system (e.g., system 100). A printed circuit board (PCB) 310 is placed in the transmission line between one or more ECUs 320 and an external port 330 such that all traffic is routed through the PCB 310. A switch is placed inside of the configuration. This can be physically done in the vehicle by identifying the intrusion defense unit's placement(s) in the vehicle and severing the transmission lines at those location(s). Once severed, the two ends of each wire can be appropriately terminated to the PCB 310.

In case of a failure of the PCB 310, which acts as a hardware peripheral to the intrusion defense unit, the traffic will be redirected in such a way as if the PCB 310 were not inserted in the transmission medium. As required, additional precautions can be taken in the PCB design to ensure that there are no resistive, inductive, or capacitive interferences to the protocol's transmission that may degrade the performance of the network.

Figure 4:
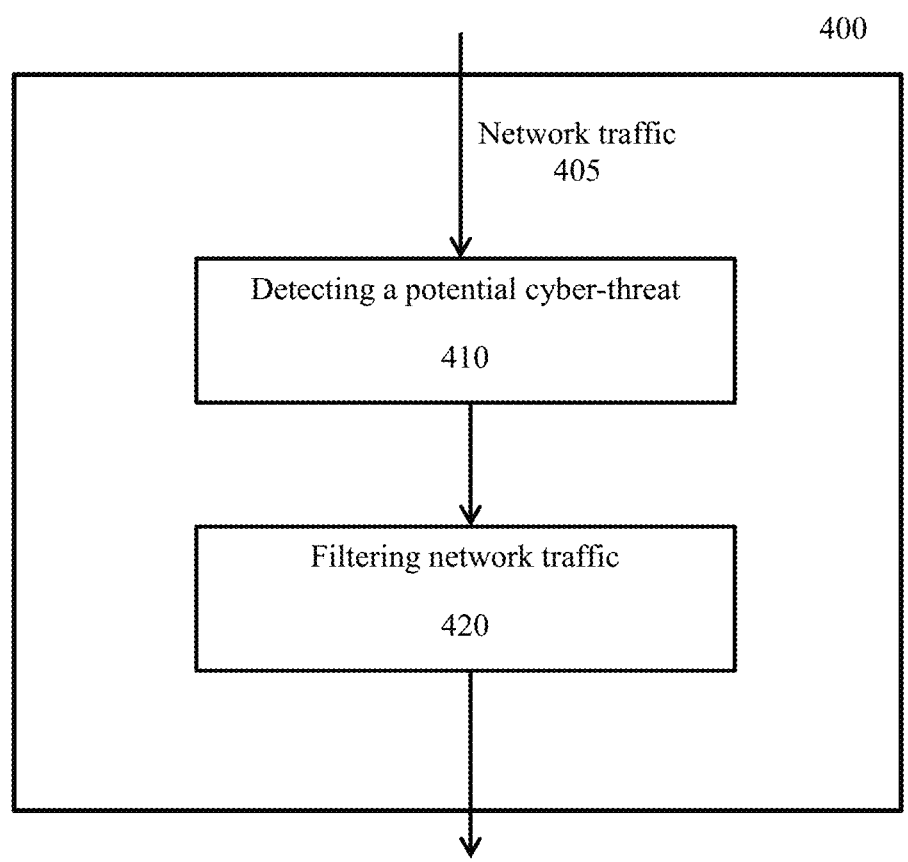
FIG. 4 illustrates an exemplary flowchart of a method for defending a network against cyber-threats.

FIG. 4 shows an exemplary method 400 that can be implemented by node device architecture(s) according to an embodiment of the present disclosure. Aspects of the method 400 can be based on the previously described system 100.

In an exemplary embodiment, the method 400 can include a step 410 of detecting a potential cyber-threat in network traffic (e.g., 105) flowing from a first node (e.g., 120) to a second node (e.g., 130) within a network bus (e.g., 110), wherein the network traffic between the first node and second node passes through an intrusion defense unit (e.g., 140). The method 400 can include a step 420 of filtering network traffic by the intrusion defense unit and an associated switch connected to the network bus to activate the mitigation and defense mode when the potential cyber-threat is detected. The filtering can continue to be performed until the cyber-threat is neutralized.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A system (e.g., system 100), as used herein, can be in combination with one or more nodes, wherein the system resides in the one or more nodes. A node can be configured to interface or contain one or more components of the systems described herein.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the exemplary methods, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A system for defending a network against one or more cyber-threats, the system comprising:
   a network bus that includes a first node and a second node, such that network traffic flows from the first node to the second node; and
   an intrusion defense unit connected to the network bus, such that network traffic between the first node and the second node passes through the intrusion defense unit, wherein:
   network traffic that passes through the intrusion defense unit is logged and cascaded to obtain searchable data; and
   when a potential cyber-threat is detected in the network traffic, the intrusion defense unit is configured to engage an associated switch to filter the network traffic until the cyber-threat is neutralized, wherein the switch is engaged by a hardware device comprising one or more MOSFETs.

2. The system of claim 1, wherein
the intrusion defense unit is configured to passively monitor the network traffic before the cyber-threat is detected.

3. The system of claim 1, wherein
the intrusion defense unit is configured to passively monitor the network traffic after the cyber-threat is neutralized.

4. The system of claim 1, wherein
the cyber-threat is detected based on an anomalous behavior of one or more nodes of the network.

5. The system of claim 1, wherein
the cyber-threat is detected based on an anomalous behavior of the network traffic.

6. The system of claim 5, wherein
the cyber-threat is detected based on a signature recognition of the anomalous behavior.

7. The system of claim 5, wherein
the anomalous behavior is detected by parsing one or more messages in the network traffic.

8. A method for defending a network against one or more cyber-threats, the method comprising:
   detecting a potential cyber-threat in network traffic flowing from a first node to a second node within a network bus, wherein the network traffic between the first node and second node passes through an intrusion defense unit;
   logging and cascading network traffic that passes through the intrusion defense unit to obtain searchable data; and
   filtering network traffic via the intrusion defense unit and an associated switch connected to the network bus, when the potential cyber-threat is detected, wherein the filtering is performed until the cyber-threat is neutralized, wherein the switch is engaged by a hardware device comprising one or more MOSFETs.

9. The method of claim 8, wherein
the intrusion defense unit is configured to passively monitor the network traffic before the cyber-threat is detected.

10. The method of claim 8, wherein
the intrusion defense unit is configured to passively monitor the network traffic after the cyber-threat is neutralized.

11. The method of claim 8, wherein
the cyber-threat is detected based on an anomalous behavior of one or more nodes of the network.

12. The method of claim 8, wherein
the cyber-threat is detected based on an anomalous behavior of the network traffic.

13. The method of claim 12, wherein
the cyber-threat is detected based on a signature recognition of the anomalous behavior.

14. The method of claim 12, comprising:
detecting the anomalous behavior by parsing one or more messages in the network traffic.

* * * * *